(12) United States Patent
Stubbs

(10) Patent No.: US 12,058,989 B2
(45) Date of Patent: Aug. 13, 2024

(54) ANGLING DEVICE

(71) Applicant: David Stubbs, Cleveland (GB)

(72) Inventor: David Stubbs, Cleveland (GB)

( * ) Notice: Subject to any disclaimer, the term of this patent is extended or adjusted under 35 U.S.C. 154(b) by 322 days.

(21) Appl. No.: 17/413,597

(22) PCT Filed: Jan. 13, 2020

(86) PCT No.: PCT/IB2020/050227
§ 371 (c)(1),
(2) Date: Jun. 14, 2021

(87) PCT Pub. No.: WO2020/148628
PCT Pub. Date: Jul. 23, 2020

(65) Prior Publication Data
US 2022/0053749 A1    Feb. 24, 2022

(30) Foreign Application Priority Data

Jan. 15, 2019  (GB) ..................... 1900517

(51) Int. Cl.
    *A01K 91/10*    (2006.01)
    *A01K 97/10*    (2006.01)
    *A01K 97/12*    (2006.01)

(52) U.S. Cl.
    CPC ............. *A01K 91/10* (2013.01); *A01K 97/10* (2013.01); *A01K 97/12* (2013.01)

(58) Field of Classification Search
    CPC ........ A01K 91/10; A01K 91/06; A01K 97/12; A01K 97/125; A01K 97/11
    USPC ..................................................... 43/15–17
    See application file for complete search history.

(56) References Cited

U.S. PATENT DOCUMENTS

| | | | | |
|---|---|---|---|---|
| 2,170,594 A | * | 8/1939 | Nicholson | A01K 91/08 43/43.12 |
| 2,640,290 A | * | 6/1953 | Ames | A01K 91/10 43/25 |
| 2,705,383 A | * | 4/1955 | Hatcher | A01K 91/10 43/16 |
| 2,783,574 A | * | 3/1957 | Bayes | A01K 97/125 43/16 |
| 2,795,072 A | * | 6/1957 | Porter | A01K 97/11 43/16 |
| 2,797,516 A | * | 7/1957 | Suddarth | A01K 91/10 43/15 |
| 2,959,884 A | * | 11/1960 | Lemay | A01K 97/00 43/43.12 |

(Continued)

FOREIGN PATENT DOCUMENTS

| | | | | |
|---|---|---|---|---|
| CA | 1136855 A | * | 12/1982 | ............ A01K 91/065 |
| CA | 1261151 A | * | 9/1989 | ............ A01K 91/10 |

(Continued)

*Primary Examiner* — Darren W Ark
(74) *Attorney, Agent, or Firm* — Jose Cherson Weissbrot

(57) ABSTRACT

An angling device comprising a housing arranged with an arm with a pivot to the housing at a proximal end and a line capture jaw at a distal end, a location means for location of the line capture jaw in use on a line of an angling rod, and a mechanism for pivoting the arm from a second position where the line capture jaw locates on the line in a second location on the rod, to a first position where the line capture jaw locates on the line in a first location on the rod, wherein the mechanism is activated automatically after movement of the line to the second location on the rod.

9 Claims, 14 Drawing Sheets

(56) References Cited

U.S. PATENT DOCUMENTS

| | | | | |
|---|---|---|---|---|
| 3,181,266 A * | 5/1965 | Lenfvenius | A01K 91/06 | 43/43.13 |
| 3,193,964 A * | 7/1965 | Hurst | A01K 91/08 | 43/43.12 |
| 3,292,906 A * | 12/1966 | Thordarson | A01K 89/017 | 254/269 |
| 3,453,765 A * | 7/1969 | Gibbons | A01K 97/11 | 43/21.2 |
| 3,499,242 A * | 3/1970 | Tucker, Sr. | A01K 87/00 | 43/43.11 |
| 3,550,302 A * | 12/1970 | Creviston | A01K 97/10 | 43/16 |
| 3,839,810 A * | 10/1974 | Lagasse | A01K 91/065 | 43/19.2 |
| 4,197,668 A * | 4/1980 | McKinsey | A01K 97/11 | 43/21.2 |
| 4,212,125 A * | 7/1980 | Kim | A01K 87/00 | 43/16 |
| 4,221,068 A * | 9/1980 | Roemer, Jr. | A01K 91/08 | 43/44.87 |
| 4,382,346 A * | 5/1983 | Gardner | A01K 91/10 | 43/15 |
| 4,417,414 A * | 11/1983 | Hood | A01K 91/08 | 43/43.12 |
| 4,524,538 A * | 6/1985 | Halvorsen | A01K 91/08 | 43/43.13 |
| 4,750,286 A * | 6/1988 | Gray | A01K 97/11 | 43/15 |
| 4,817,328 A * | 4/1989 | Hartley | A01K 91/08 | 43/43.12 |
| 4,932,151 A * | 6/1990 | Cicha | A01K 91/065 | 43/26.1 |
| 5,056,255 A * | 10/1991 | Campbell | A01K 91/065 | 43/26.1 |
| 5,084,995 A * | 2/1992 | Beaudoin | A01K 91/065 | 43/26.1 |
| 5,170,581 A * | 12/1992 | Lyons | A01K 91/08 | 43/43.12 |
| 5,499,469 A * | 3/1996 | Guillemette | A01K 91/10 | 43/16 |
| 5,752,461 A * | 5/1998 | Whisenhunt | A01K 91/08 | 43/27.4 |
| 5,855,542 A * | 1/1999 | Wilks | A01K 91/10 | 493/15 |
| 6,012,247 A * | 1/2000 | Kinsey | A01K 91/10 | 43/16 |
| 6,088,945 A * | 7/2000 | Sanderfoot | A01K 97/01 | 43/4.5 |
| 6,634,134 B1 * | 10/2003 | Nyquist | A01K 97/10 | 43/16 |
| 6,966,140 B1 * | 11/2005 | Rozkowski | A01K 97/125 | 43/17 |
| 7,152,360 B1 * | 12/2006 | Neufeld | A01K 91/10 | 43/15 |
| 7,454,861 B1 * | 11/2008 | Keibler | A01K 97/125 | 43/17 |
| 7,624,531 B2 * | 12/2009 | Kirby | A01K 97/10 | 43/17 |
| 7,874,096 B2 * | 1/2011 | Callaway | A01K 97/00 | 43/4.5 |
| 8,033,044 B2 * | 10/2011 | Hails | A01K 91/10 | 43/43.15 |
| 9,756,840 B1 * | 9/2017 | Hernandez | A01K 91/053 | |
| 10,709,123 B2 * | 7/2020 | Faulks | A01K 91/065 | |
| 11,272,697 B1 * | 3/2022 | White | A01K 97/125 | |
| 2001/0049899 A1 * | 12/2001 | Keller | A01K 91/065 | 43/19.2 |
| 2003/0097779 A1 * | 5/2003 | Shackelford | A01K 97/125 | 43/17 |
| 2006/0032105 A1 * | 2/2006 | Modglin | A01K 91/065 | 43/21.2 |
| 2009/0031609 A1 * | 2/2009 | Kirby | A01K 97/10 | 43/17 |
| 2010/0107470 A1 * | 5/2010 | Cowin | A01K 91/06 | 43/44.95 |
| 2010/0236127 A1 * | 9/2010 | Roh | A01K 97/11 | 43/15 |
| 2012/0079754 A1 * | 4/2012 | Walko | A01K 91/065 | 43/4.5 |
| 2012/0102812 A1 * | 5/2012 | Payne | A01K 97/11 | 43/21.2 |
| 2014/0215894 A1 * | 8/2014 | Mika | A01K 91/065 | 43/43.1 |
| 2015/0245601 A1 * | 9/2015 | Herzog | A01K 97/11 | 43/15 |
| 2016/0057986 A1 * | 3/2016 | Drees | A01K 91/10 | 43/15 |
| 2016/0174538 A1 * | 6/2016 | Cooper | A01K 97/11 | 43/15 |
| 2017/0086438 A1 * | 3/2017 | Faulks | G06F 3/03547 | |
| 2018/0139942 A1 * | 5/2018 | Varian | A01K 85/01 | |
| 2020/0163321 A1 * | 5/2020 | Nibecker | A01K 97/10 | |

FOREIGN PATENT DOCUMENTS

| | | | | |
|---|---|---|---|---|
| KR | 20040084343 A | * | 10/2004 | |
| KR | 20050035811 A | * | 4/2005 | |
| SK | 201500015 A3 | * | 2/2017 | |
| WO | WO-2015000015 A1 | * | 1/2015 | A01K 91/03 |

* cited by examiner

ANGLING DEVICE

FIELD OF THE INVENTION

The present invention relates to an angling device, in particular a device for striking.

BACKGROUND

Increasing numbers of people enjoy fishing or angling in many countries, as a hobby, sport and even food source.

Fishing or angling is a time-consuming hobby, and many potential users enjoy the time spent.

However many of such users may be concerned at missing a bite if they do not pay attention at all times to the line, particularly in relation to subtle bites or "takes".

When a fish has bitten it is preferable to pull on the line to hook the fish, in what is known as striking. Striking is the process of sweeping the fishing rod backwards when a bite is detected in order to securely set the hook in the mouth of a fish. Sometimes fish will hit the bait so hard they will hook themselves. However, some fish chew they bait or cautiously take it into their mouth which means the angler or user needs to strike.

PRIOR ART

US 20150245601 (FIERZOG) discloses a hook setting apparatus having a base, a rod holder block rotatable about a shaft in communication with the base, a rod holder tube connected to the rod holder block, a trigger rod movably mounted in the base and connected to the rod holder block, and selectively contactable with a trigger block, a trigger trip rod connected to the trigger block, and movement of the trigger trip rod imparts motion to the trigger block and releases the selective contact between the trigger block and the trigger rod and causes the rod holder block to rotate about the shaft.

WO 201500015 (COOPER) discloses a fish striking device for attachment to a fishing rod and line comprises a channel body containing tension means one end of which is retained at one end of the channel and the other end of which is fixed to a trigger mechanism slidably mounted on the channel which trigger mechanism is releaseably retained on the channel and engages the Sine of the fishing rod such that when a fish pulls on the line the trigger mechanism is released and the Sine is pulled taught by the released tension means.

U.S. Pat. No. 5,499,469 (GUILLEMETTE) discloses a fish hook setting device comprising a housing having side walls, end walls and a bottom wall. A solenoid is secured within the housing and is activated by a solenoid actuator. The actuator is operatively associated with a fishing line and responds to line weight. The actuation of the solenoid causes the fishing line to be pulled up a predetermined distance. The device also comprises means for deactivating the solenoid. Upon deactivation, the elements of the device return to their starting position and the device can be activated once more.

The present invention arose in order to overcome problems suffered by existing devices.

SUMMARY OF THE INVENTION

According to the present invention there is provided angling device for use with an angling rod comprising: a housing arranged with an arm with a pivot to the housing at a proximal end, and a line capture jaw at a distal end, and a mechanism for pivoting the arm between at least a first position and a second position; wherein the mechanism for pivoting the arm is activated automatically.

Advantageously there is reduced chance of the angler or user not striking in time. The angler is not required to constantly watch their fishing line.

In some embodiments the arm's first position is relatively parallel the rod, and the arm's second position is relatively orthogonal the rod, and a third position may be provided by movement of the device or arm, which third position may be relatively parallel the rod, for example return movement of the arm.

In other embodiments the arm positions are relatively parallel the rod, and in the second position the line is pulled further along the rod away from a user's end of the rod. A third position may comprise a return to the location on the rod of the first position.

In this way the device is located onto the rod in use, and the mechanism is arranged to move the line towards the user or angler end of the rod, or more particularly pull on the line to catch or strike the line.

It may be envisaged that the device may comprise a sensor, so as to sense when to operate, or when the second position has been reached, and when to move to the first/third position, and/or when there has been a bite.

The sensor may be arranged to register movement of the line. For example movement of the line may move the line capture means, and consequently the arm. Such movement of the arm may release a sensor, or a part of the arm or device or line may come into contact with a sensor. For example movement of the line may pivot the arm from the first position to the second position, where the sensor is located to register this movement or that the line has reached this location on the rod.

In a second step the arm may be moved by the mechanism from the second position back to the first position. In this way the arm may pull the line so as to strike the line and hook the fish.

In some embodiments the sensor may comprise a sensor arranged to register movement from the first position to the second position, and thereafter trigger, release or drive movement to the third position, i.e. back to the first position.

The device may comprise a driven arm, for example using a solenoid, which solenoid is arranged to drive the arm on its pivot back to the first position. The arm may be driven through a spring in some embodiments. For example the solenoid may be arranged to release the spring.

In some embodiments the location means may be permanent, in others the location means may be temporary. For example the location means may comprise a clamping means, arranged to clamp the housing to the rod at an intermediate location along the rod.

In some embodiments therefore the location means may locate the device or housing on the rod.

In other embodiments the location means may locate the device proximate the rod in use. For example the location means may be envisaged to comprise one or more legs, which legs may be placed on the ground or another surface so as to locate the device for use with the rod.

In some embodiments the housing may comprise a lid or cover or other means to ensure that the device may be highly portable and capable of closure and carriage.

In some embodiments the line capture jaw may comprise a clip, catch or clamp, or other temporary means. The line capture jaw thereby is enabled to capture the line so as to enable the line to be moved during movement of the arm.

The housing may comprise an internal battery so as to power the arm movement between positions, or more particularly drive the mechanism to move between the second and first position. The arm movement may be driven by a motor, rotating the arm between positions on the pivot.

The device of the present invention thereby automatically strikes the fishing line in response to a freshwater fish taking the angler's bait. For example when a fish has taken the bait, the arm may pivot and come into contact with the proximity switch sensor in the second position which sensor may release the mechanism driving the arm on the pivot round to the first position again.

Striking is a matter of judgement, where strike too soon and the bait and hook will be pulled away from the fish, or strike too late and the fish may have taken the bait all the way down into its stomach and be gut hooked.

Therefor in some embodiments the device may advantageously comprise a line length adjustment means, which adjustment may define line length between positions. In this way the user may be enabled to allow a shorter or longer length of line to be taken by the fish before returning of the arm to the first position.

A preferred embodiment of the invention will now be described by way of example only and with reference to the Figures in which:

DETAILED DESCRIPTION OF FIGURES

Figure 1:
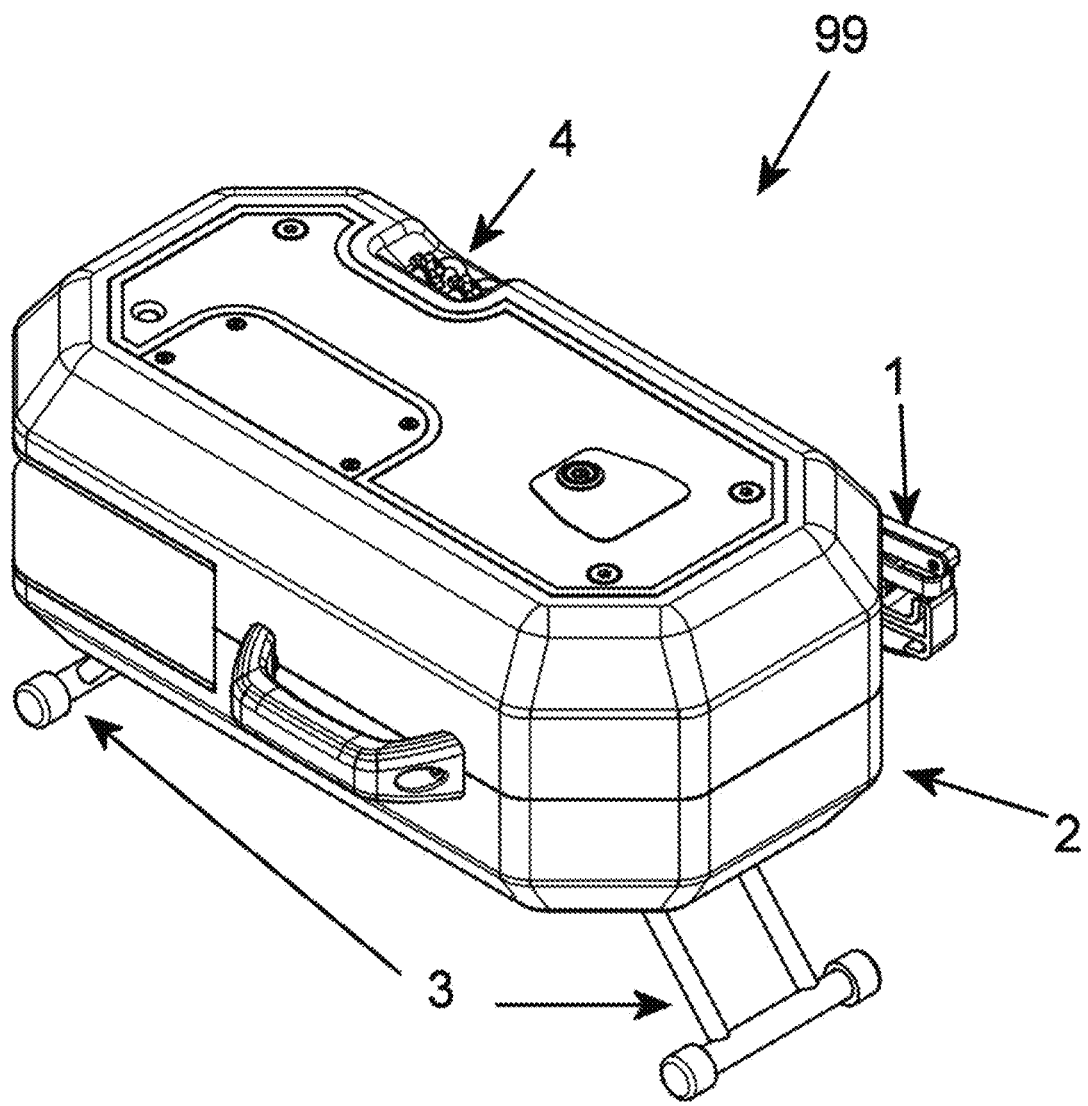
FIG. 1 shows an isometric view of an embodiment of the device of the present invention in a first position with location means extended.
Figure 2:
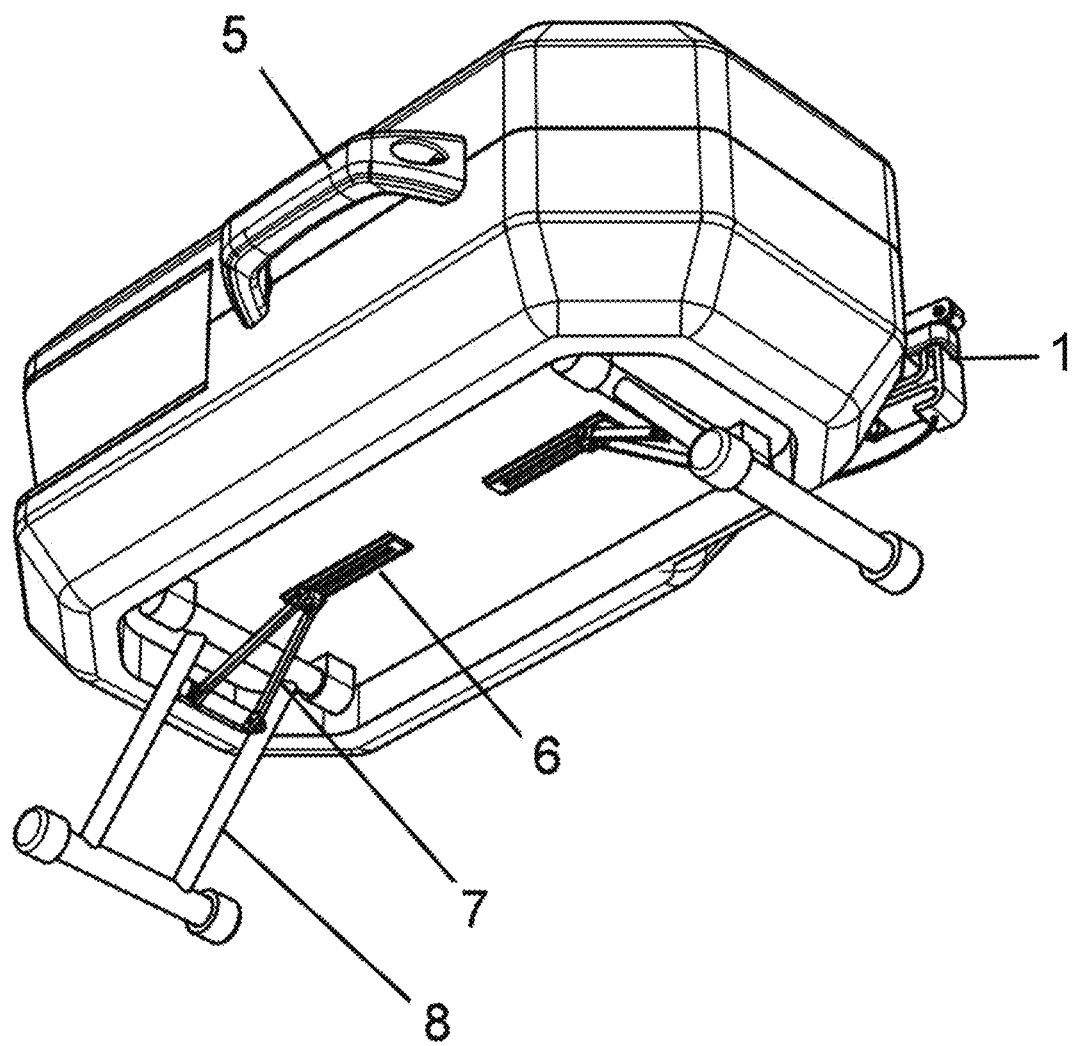
FIG. 2 shows a reverse isometric view of the embodiment as shown in FIG. 1.
Figure 3:
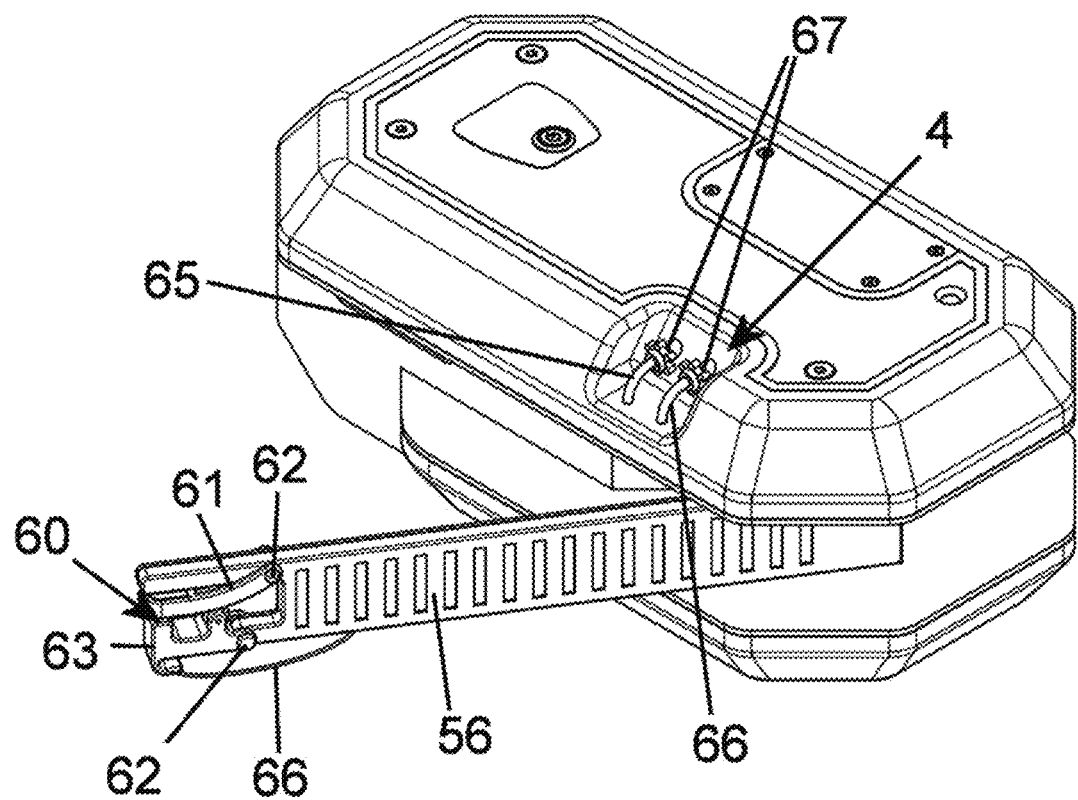
FIG. 3 shows an isometric view of the embodiment shown in FIG. 1, in the second position with location means collapsed.
Figure 4:
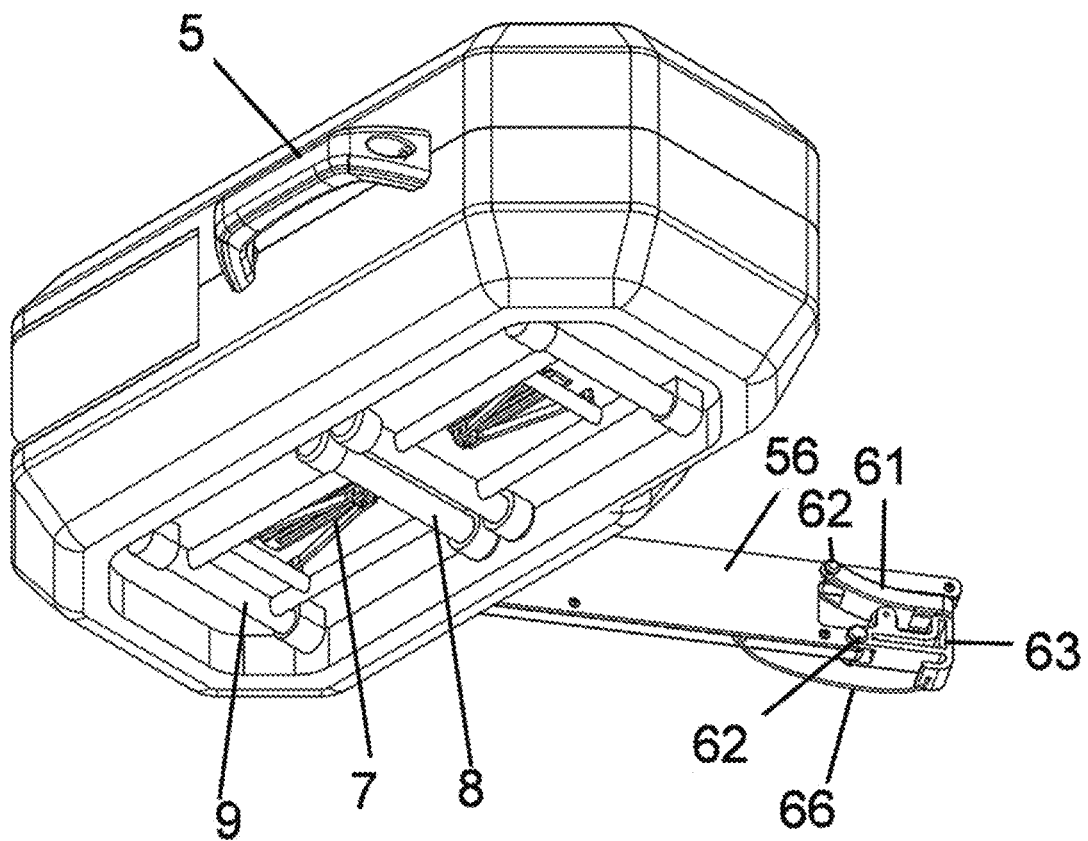
FIG. 4 shows a reverse isometric view of the embodiment as shown in FIG. 3.
Figure 5:
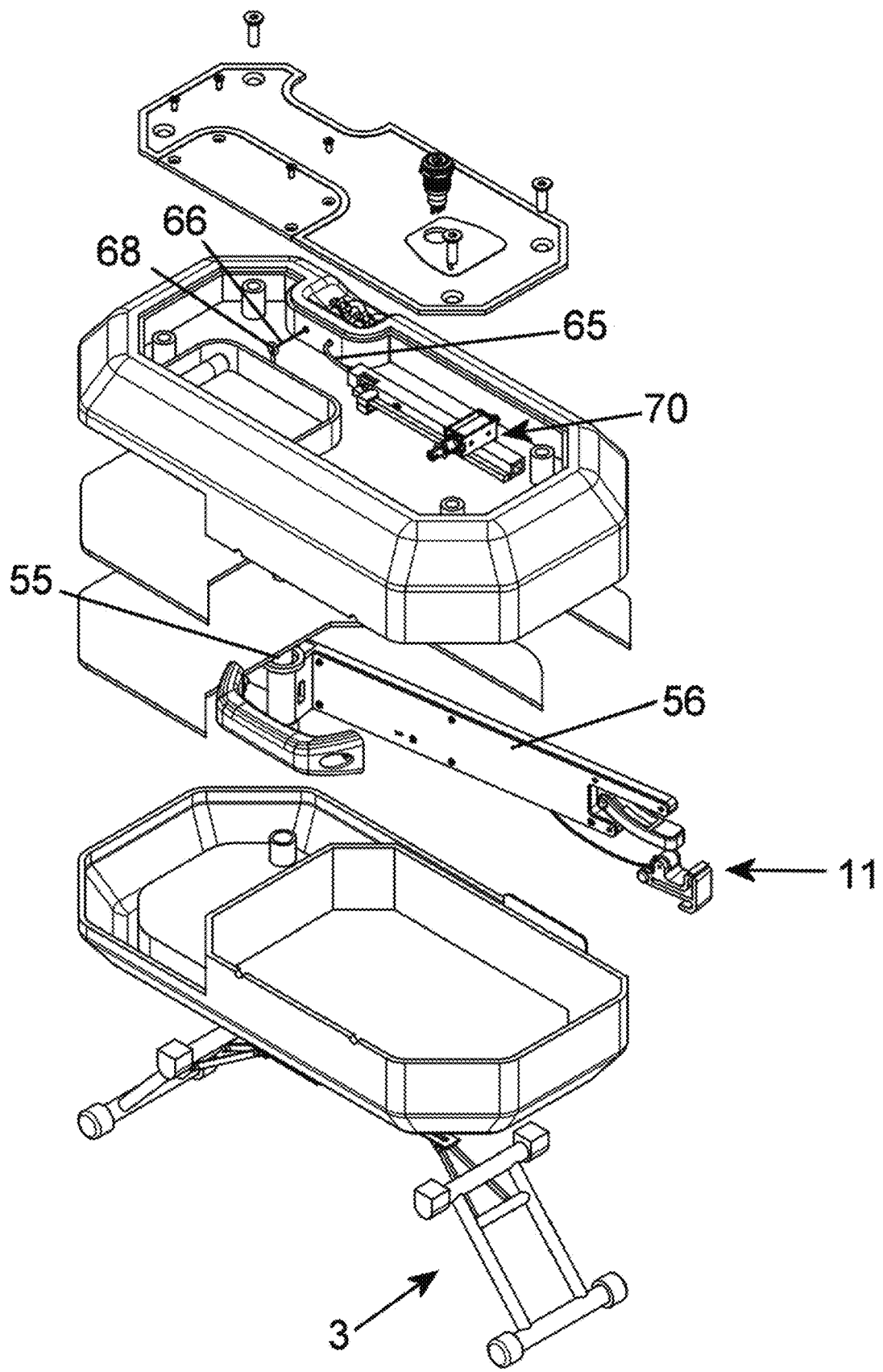
FIG. 5 shows an exploded isometric view of the embodiment shown in FIG. 1.
Figure 6:
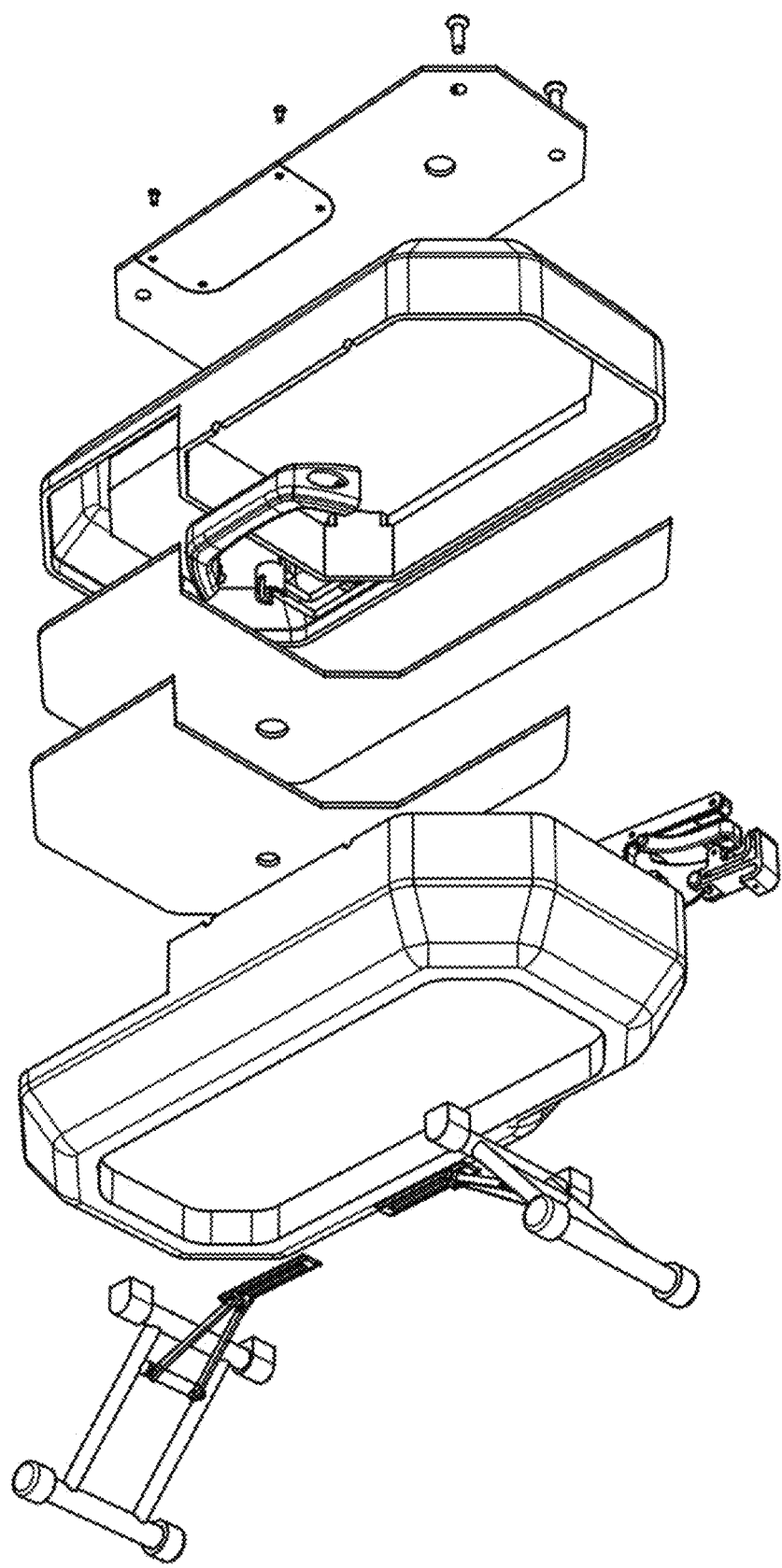
FIG. 6 shows a reverse isometric view of the embodiment shown in FIG. 1.
Figure 7A:
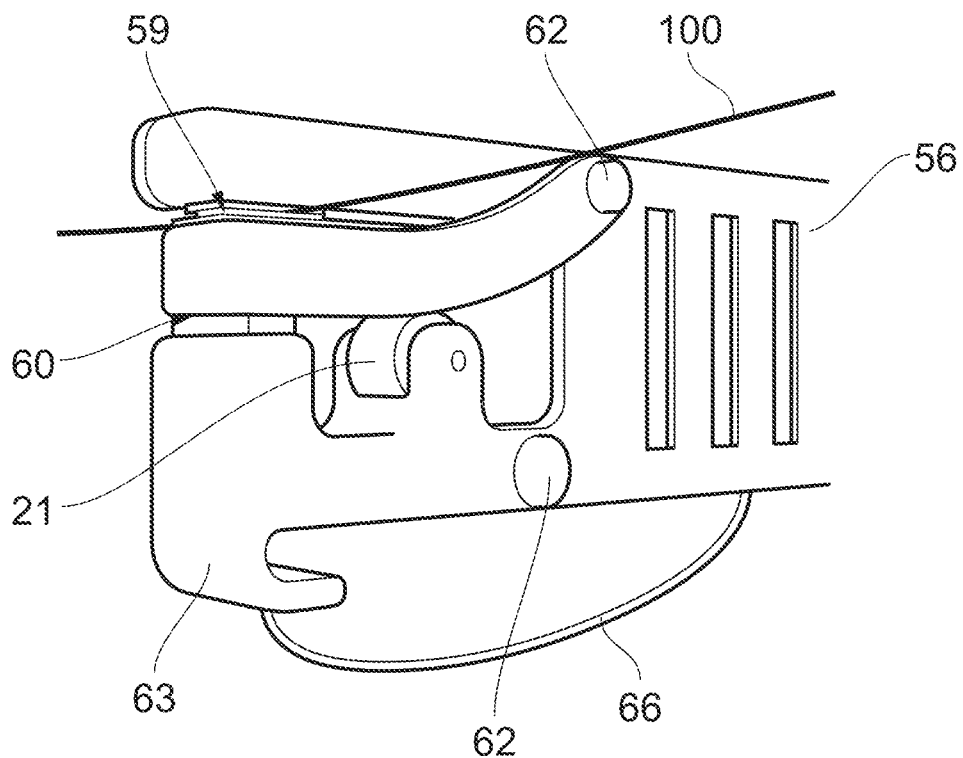
FIGS. 7a and 7b show detail isometric views of the line capture means and a diagrammatic isometric view of movement of the arm between positions, respectively.
Figure 7B:
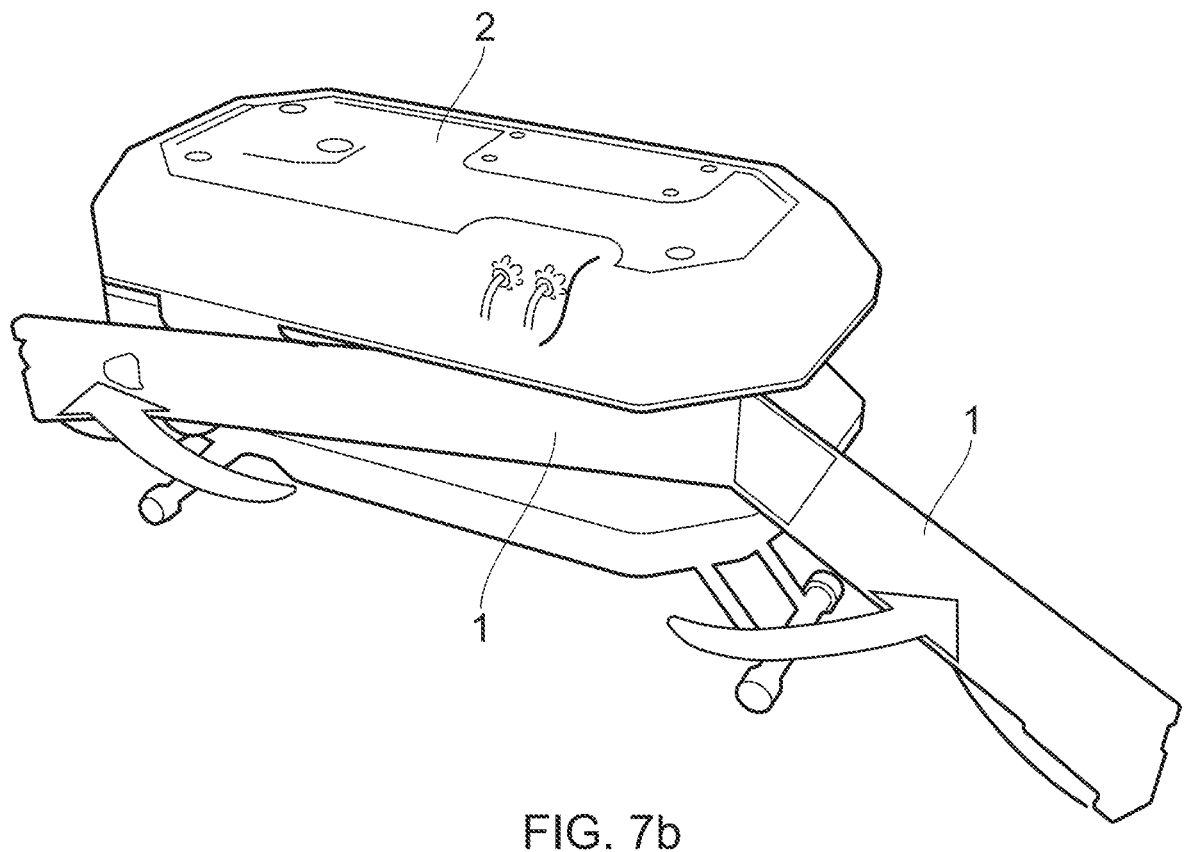
Figure 8A:
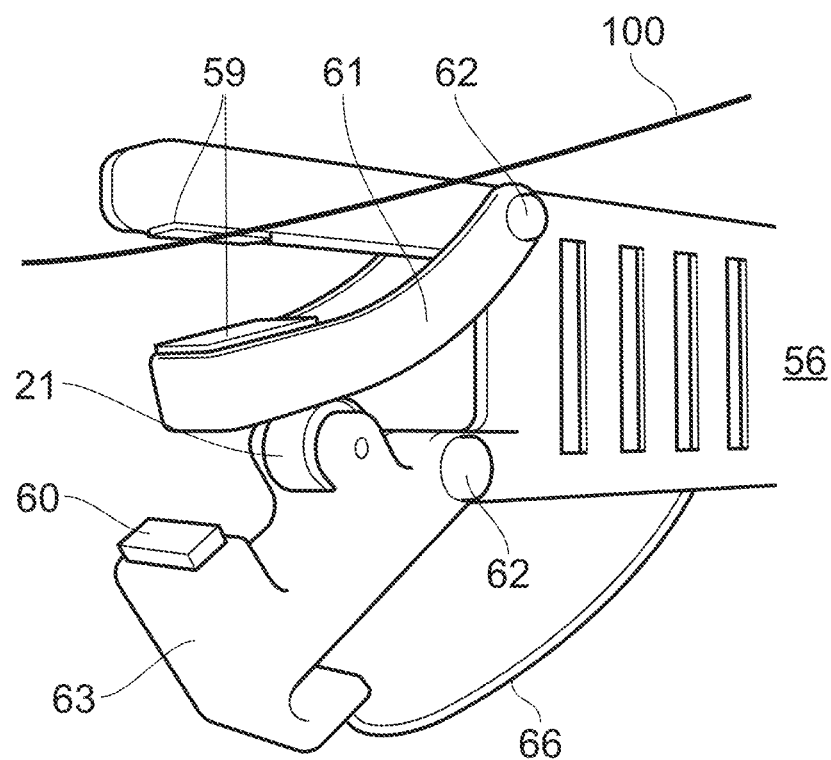
FIGS. 8a and 8b show detail isometric views of the line capture means and a diagrammatic plan view of movement of the arm between positions, respectively.
Figure 8B:
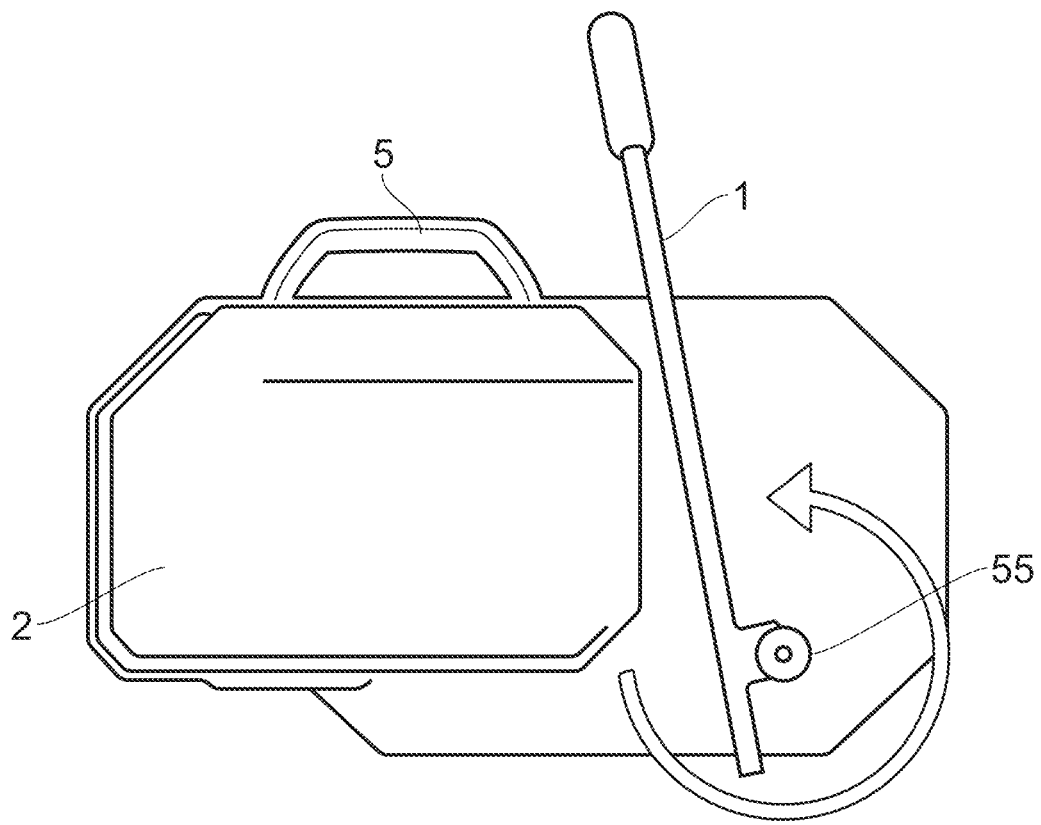
Figure 9:
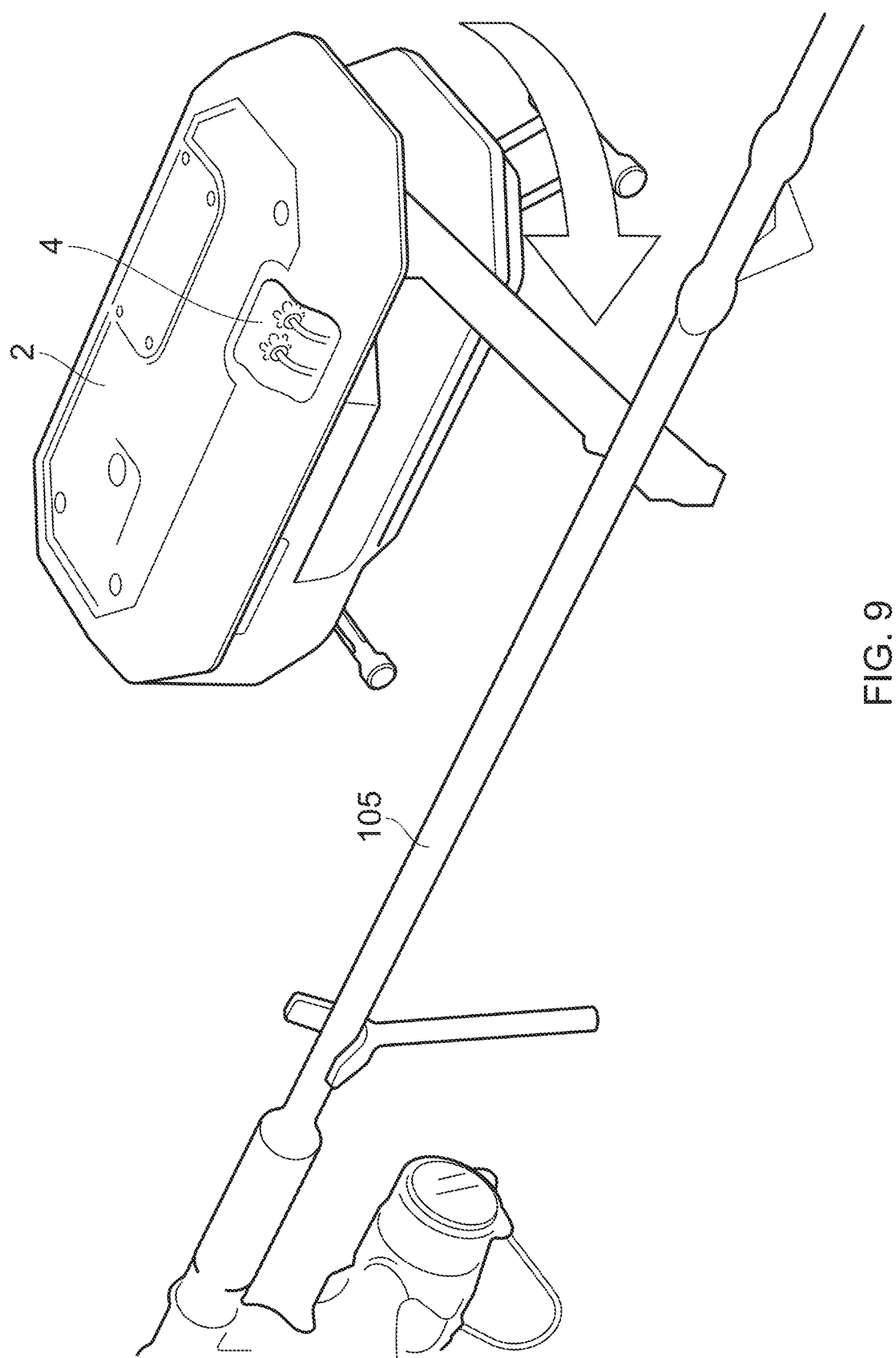
FIG. 9 shows an isometric view of the embodiment shown in FIG. 1 in use.
Figure 10:
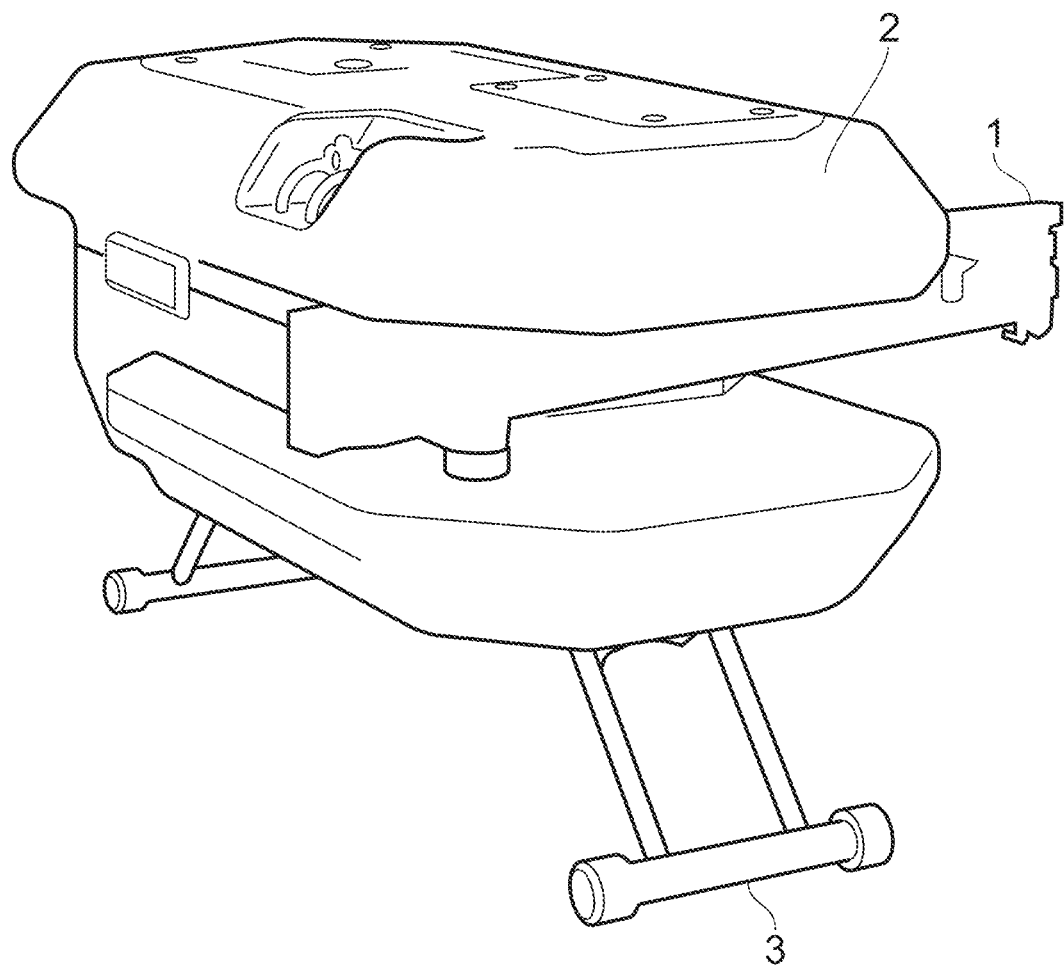
FIG. 10 shows an isometric view of the embodiment shown in FIG. 1.
Figure 11:
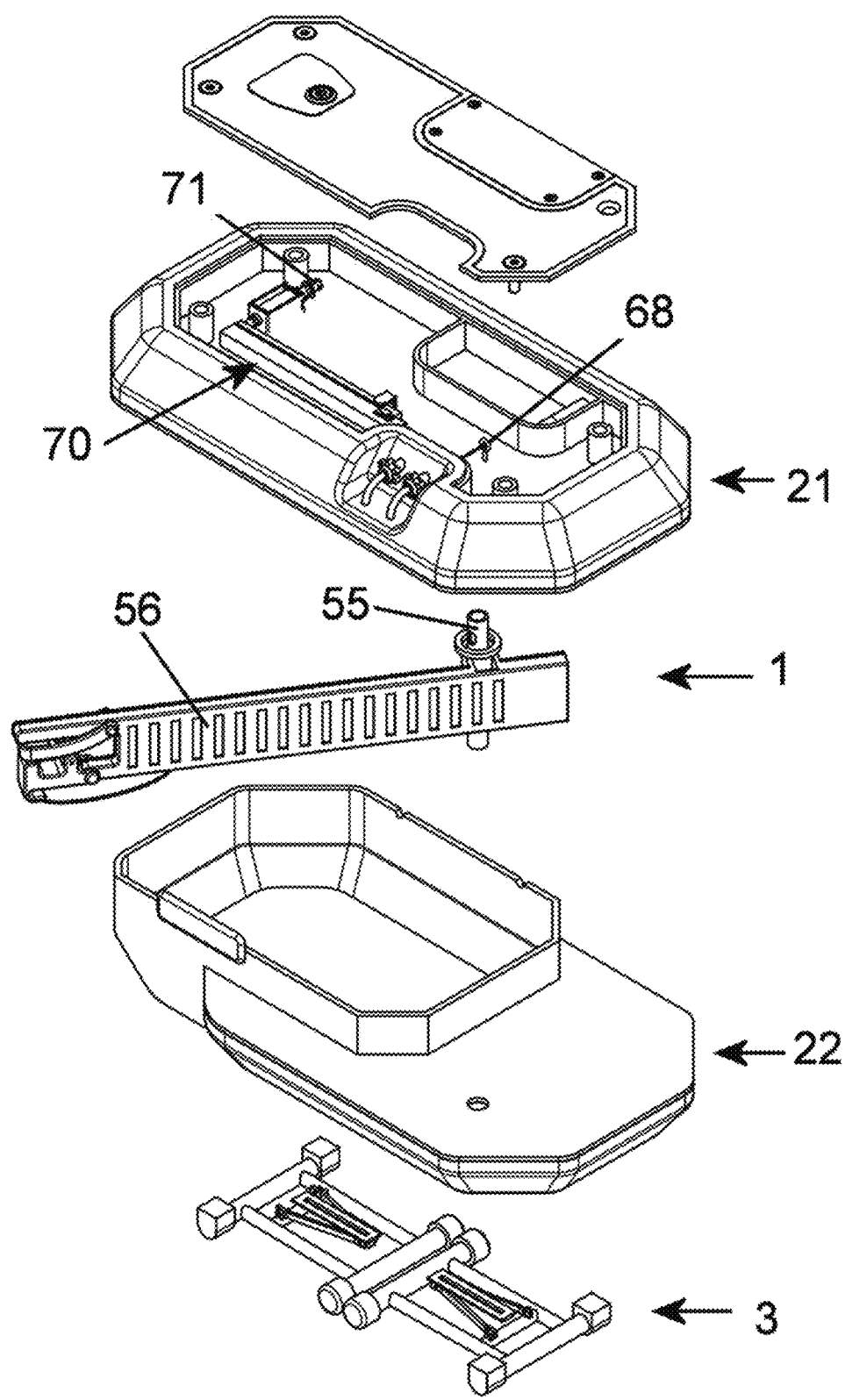
FIG. 11 shows an exploded isometric view of the embodiment shown in FIG. 1.
Figure 12:
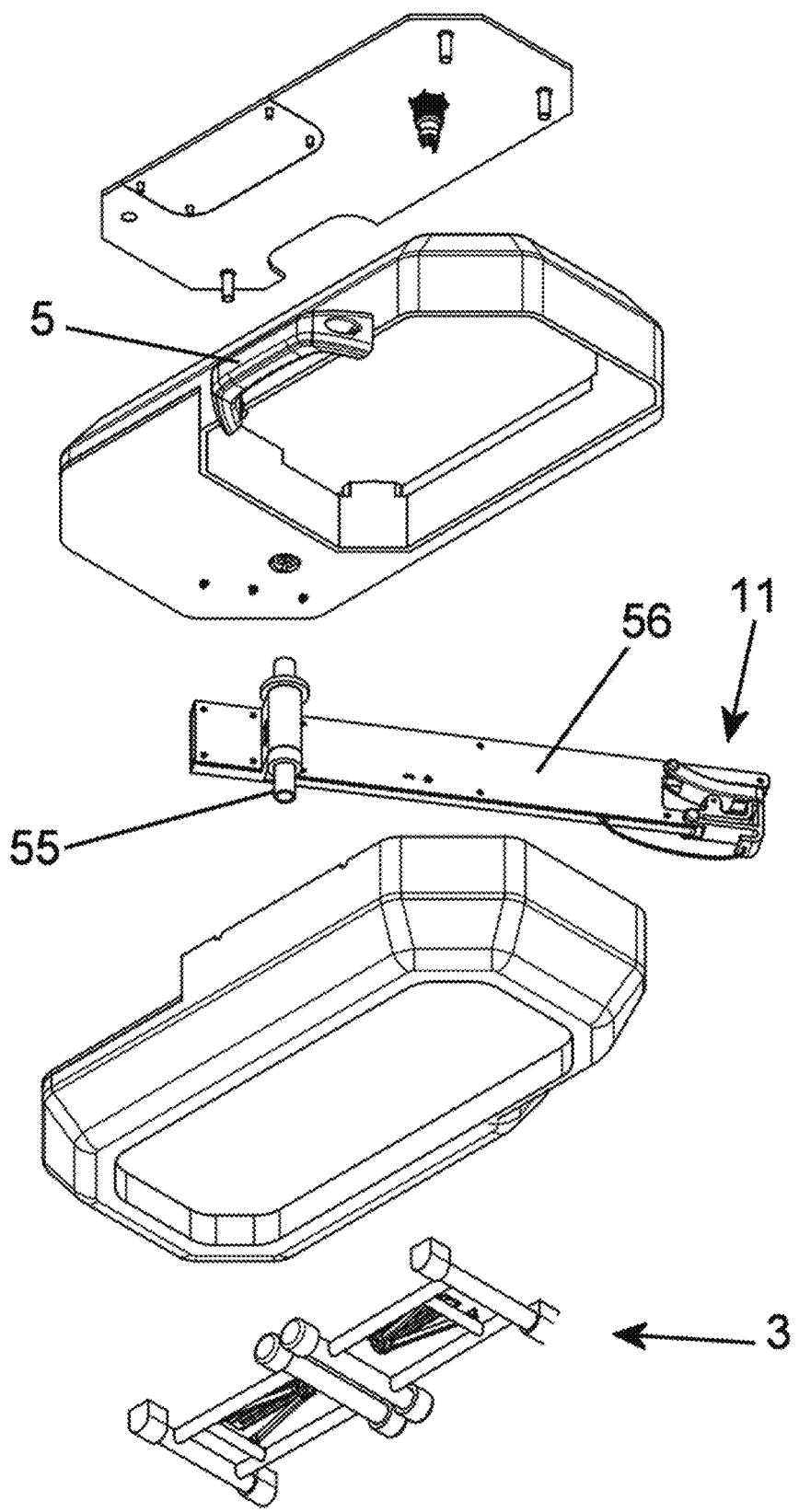
FIG. 12 shows a reverse exploded isometric view of the embodiment shown in FIG. 1.

With reference to the figures there is shown an embodiment of the device generally comprising an angling device 99 comprising a housing 2 arranged with an arm 1 with a pivot 55 to the housing at a proximal end and a line capture jaw 11 at a distal end, a location means 3 for location of the line capture jaw in use on a line 100 of an angling rod 105, and a mechanism 70 for pivoting the arm 1 from a second position where the line capture jaw 11 locates on the line 100 in a second location on the rod, to a first position where the line capture jaw 11 locates on the line 100 in a first location on the rod 105, wherein the mechanism 70 is activated automatically after movement of the line 100 to the second location on the rod 105.

The mechanism 70 comprises a sensor (not shown) arranged to register when the line capture jaw 11 has reached the second position, and a solenoid 71 arranged to trigger release of a spring 74 to drive the arm 1 to pivot return from the second to the first position.

In this way the device of the present invention enables the line to be retracted automatically after a bite has pulled on the line a defined amount.

The defined length of line movement between positions may be adjusted by an adjustment means 4 in the pictured embodiment. Adjustment of the arm cable length and the jaw cable length are both accomplished by screw cogs 67, whereby the distance of travel of the arm cable affects the distance travelled to the second position, by changing position of the first position; and the length of the jaw cable is adjustable to suit.

The device is thereby arranged to automatically strike the fishing line in response to a fish taking the angler's bait.

The device comprises a rectilinear rigid housing 2, formed in a rigid thermoplastics, aluminium or coated steel by an upper and a lower housing 21,22.

The housing 2 has a handle 5 a pair of legs underneath forming the location means 3. The location means 3 is thereby provided by two legs 8 which are arranged to pivot out of an indentation in the bottom of the housing, and are secured into an in-use position by spring-loaded stoppers 7, which stoppers act to brace the legs and are arranged to slide in slots 6. In some other embodiments the legs may be telescopic. The legs mean that the location means is enabled to locate the device on ground close to the rod in use. In some embodiments the location means may comprise pegs or pins, for example available separately and used to peg the device to the ground.

Figure 13:
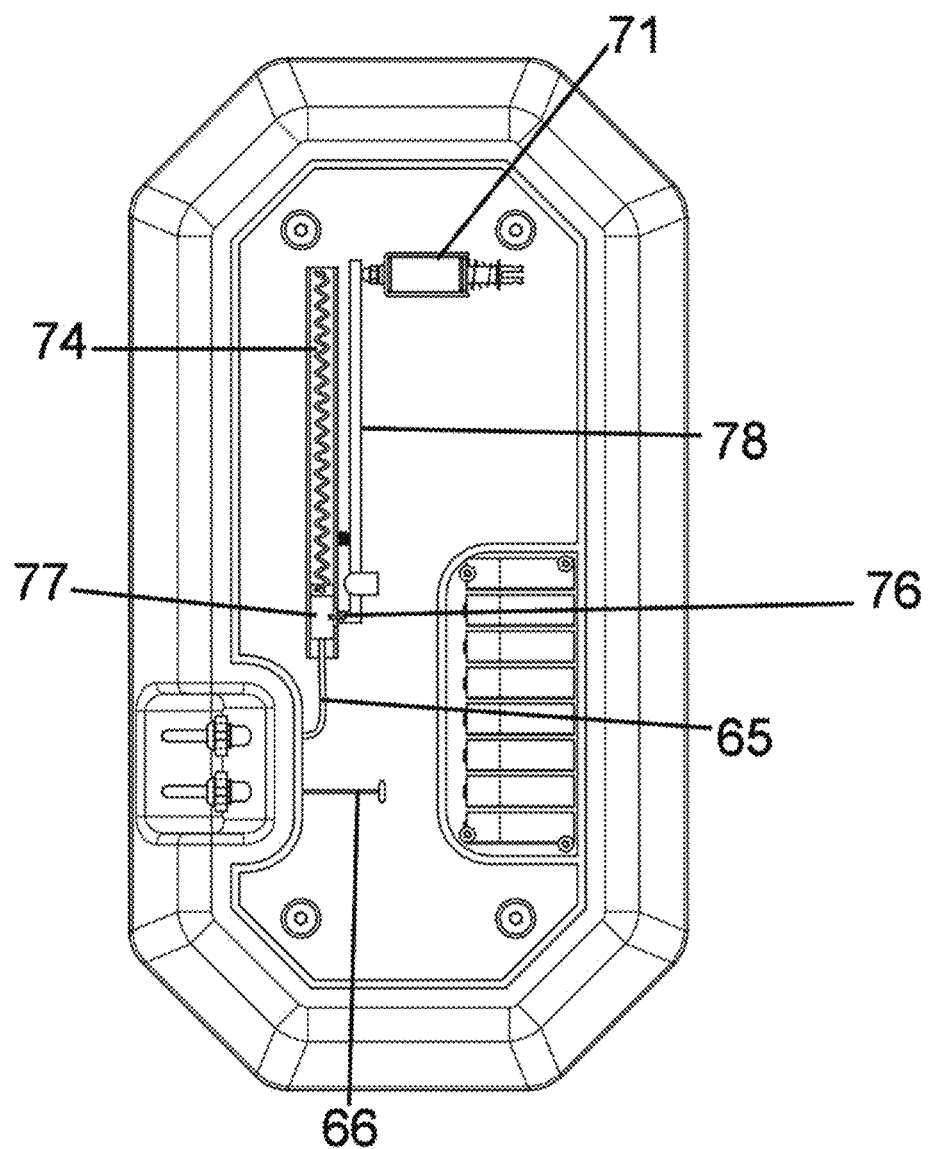
FIGS. 13 and 14 show plan views of the interior of the housing and the mechanism of the embodiment shown in FIG. 1.

In the pictured embodiment as shown in FIG. 13 the arm is connected by an arm cable 65 to a piston block 77 which is attached to the spring 74.

Figure 14:
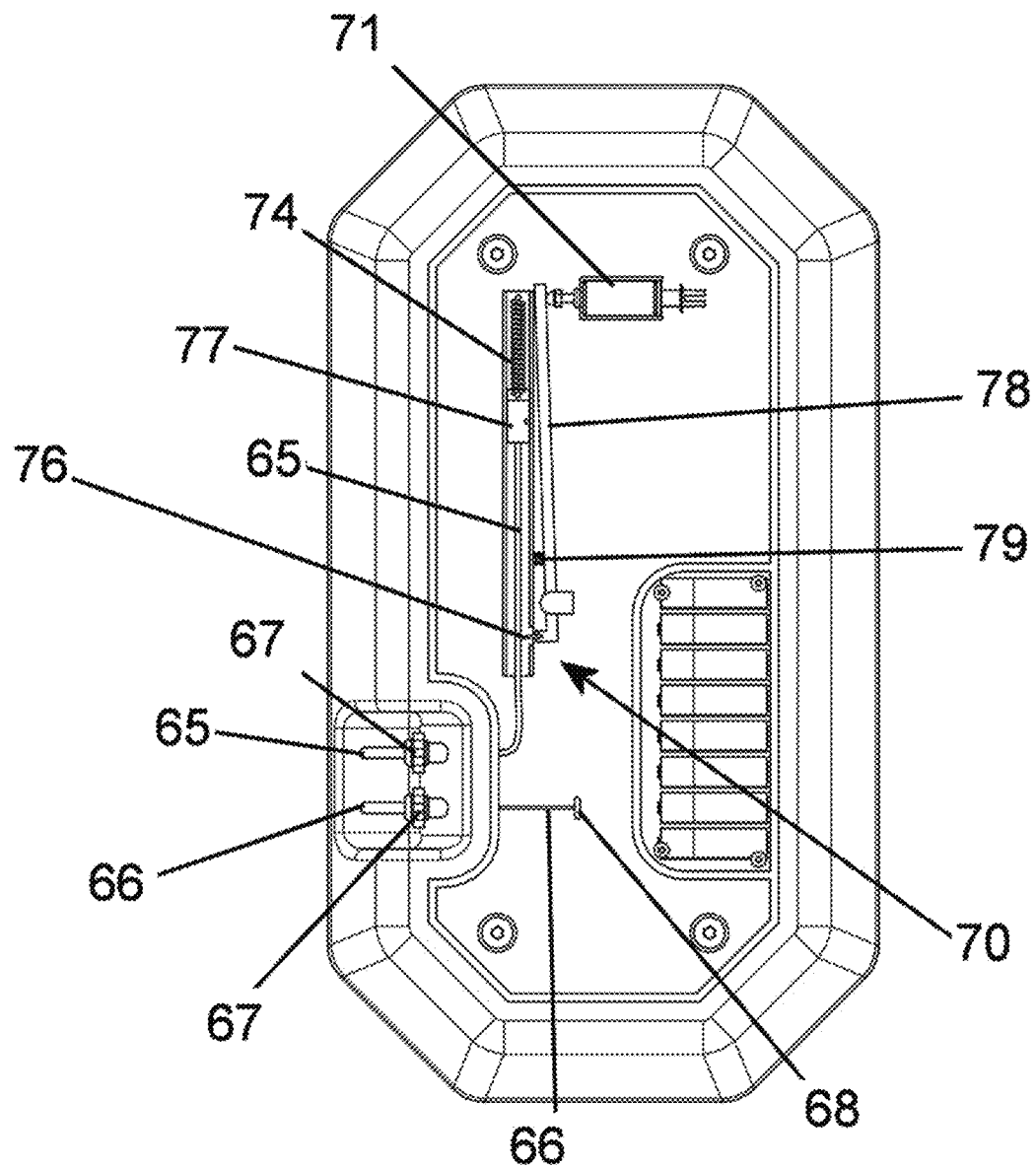

As shown in FIG. 14 a lever 78 withdraws a pin 76 from a hole in the piston block 77 by the movement of the solenoid 71.

As the arm moves to the first position to reset the mechanism, the arm cable 65 is pulled and displaces the piston block 77, opening the lacuna. The hole is opened when the arm is set rotating back to the first position, where the arm cable pulls against a torsion spring pulling the piston block 77 in the opposing direction.

As shown in FIGS. 13 and 14 the mechanism's return is driven by an arrangement comprising release of the torsion spring piston block 77, the pin 76 acting to lock the piston block 77 when the arm has been set and release the pin 76 from the hole.

When the magnetic sensor is triggered by a magnet on the arm end the solenoid 71 subsequently pushes against an end of the lever 78, which distal end comprises an arm cable is pulled and pin 76 engaging into a hole in the piston block's housing, such that when the solenoid pushes against the proximal end of the lever 78 which pivots on a pivot 79 and the distal end disengages and releases the piston block 77.

The solenoid is powered by onboard batteries.

The piston block 77 is reset by movement of the arm in the opposing direction, which movement pulls the arm cable 65.

The fishing line is securely fastened inside the line capture jaw 11 in use.

A jaw cable 66 releases the line capture jaw 11 when taut.

The arm cable 65 is pulled by the arm displacement.

The arm cable is pulled by the arm displacement's into the second position when the fish pulls on the line. The arm's displacement into the second position approximates a magnet on the arm end proximate the jaw, to a sensor in the housing.

The sensor subsequently fires the solenoid 71, which in turn pushes the lever 78 end and at the distal lever end the pin 76 exits the hole, such that the piston block 77 is freed and the torsion spring 74 pulls back the piston block 77 and the arm cable in turn.

This arm cable 65 thereby pulls the arm 1 back sharply when bait has been taken.

In use the user will:

Rotate the arm 1 into the first position clockwise with the fishing rod 105 parallel to the device 99 to its right.

Cast the fishing rod 105 and clamp the line 100.

When a fish has taken the bait, the arm 1 will rotate anti-clockwise into the second position and come into contact with the proximity switch.

This will cause the solenoid 71 to trigger which releases the lever 78, and pulls the arm 11 clockwise, and the cable 65 and line backwards, hooking the fish.

The jaw cable 66 will become taut and release the line 100.

The angler must then reel in the fish.

To reset the device, the device is turned off, then the user rotates the arm anti clockwise until it reaches the limit to engage the lever 78 and return to the first position.

In the pictured embodiment the line capture jaw comprises two arm members 61, 63 pivoting on end pivots 62 and at the distal end comprising resilient pads 59, 60, wherein the top arm member 61 is curved and arranged to push the pad 59 against the underside of a projection from the arm 56, and the bottom arm member 63 is arranged to push the pad 60 against the underside of the top arm member 61.

The top arm member 61 and the arm projection 56 together hold the line 100 between the pads 59.

The bottom arm member 63 comprises an over-centre wheel 80 which runs on the underside of the curved top arm member 61 so as to push the top arm member 61 upwards and depress the pads 59 together. The bottom arm member pad 60 is likewise pushed up and depressed against the underside of the top arm member 61.

The jaw cable 66 is arranged to pull down on the far end of the underside of the bottom arm member 63 to release the pressure on the pads 59,60. The jaw cable is attached at the distal end to an anchor 68, and its length is adjusted by a screwthread cog 67 on the housing 2.

The invention has been described by way of examples only and it will be appreciated that variation may be made to the above-mentioned embodiments without departing from the scope of invention as defined by the claims, in particular but not solely combination of features of described embodiments.

What is claimed is:

1. An angling device for use with an angling rod, the angling device comprising:
   a housing arranged with an arm with a pivot to the housing at a proximal end of the arm, and a line capture jaw at a distal end of the arm, wherein a fishing line is securely fastened inside the line capture jaw in use; and
   a mechanism for pivoting the arm between at least a first position and a second position, the arm thereby pulling the fishing line, and for opening the line capture jaw and releasing the fishing line,
   wherein the arm is attached with an arm cable to the mechanism,
   wherein the mechanism for pivoting the arm is activated automatically when the fishing line held in the line capture jaw is placed under tension, and when the arm reaches the second position, the mechanism triggers the opening of the line capture jaw to release the fishing line to run freely.

2. The angling device according to claim 1, comprising a location means for arranging the angling device proximate to the angling rod.

3. The angling device according to claim 1, wherein the arm is attached to the housing via the pivot.

4. The angling device according to claim 1, wherein the line capture jaw is attached with a jaw cable to the housing.

5. The angling device according to claim 1, wherein the mechanism comprises a solenoid.

6. The angling device according to claim 1, wherein the mechanism comprises a spring.

7. The angling device according to claim 1, wherein the mechanism comprises a proximity sensor.

8. The angling device according to claim 1, wherein the mechanism comprises an adjustment means to adjust line length before activation.

9. The angling device according to claim 1, wherein upon reaching the second position, the arm activates the mechanism thereby opening the line capture jaw to release the fishing line.

* * * * *